United States Patent
Stonedahl

(10) Patent No.: US 9,532,105 B2
(45) Date of Patent: *Dec. 27, 2016

(54) SYSTEM AND METHOD FOR SELECTING, CAPTURING, AND DISTRIBUTING CUSTOMIZED EVENT RECORDINGS

(71) Applicant: Dale Stonedahl, Boulder, CO (US)

(72) Inventor: Dale Stonedahl, Boulder, CO (US)

(73) Assignee: Dale Stonedahl, Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/004,241

(22) Filed: Jan. 22, 2016

(65) Prior Publication Data

US 2016/0142781 A1    May 19, 2016

Related U.S. Application Data

(63) Continuation of application No. 14/705,085, filed on May 6, 2015, now Pat. No. 9,247,194, which is a
(Continued)

(51) Int. Cl.
*H04N 21/2747* (2011.01)
*H04N 21/472* (2011.01)
(Continued)

(52) U.S. Cl.
CPC .... *H04N 21/47202* (2013.01); *G06Q 30/0601* (2013.01); *G11B 27/10* (2013.01); *H04N 5/91* (2013.01); *H04N 7/17327* (2013.01); *H04N 21/2187* (2013.01); *H04N 21/242* (2013.01); *H04N 21/2747* (2013.01); *H04N 21/4302* (2013.01); *H04N 21/44222* (2013.01); *H04N 21/472* (2013.01); *H04N 21/6543* (2013.01); *H04N 21/6581* (2013.01); *H04N 21/8456* (2013.01)

(58) Field of Classification Search
CPC ................ H04N 41/44222; H04N 21/2747; H04N 7/17327
See application file for complete search history.

(56) References Cited

U.S. PATENT DOCUMENTS

| 4,507,680 A * | 3/1985 | Freeman | H04N 7/10 348/484 |
| 5,410,326 A * | 4/1995 | Goldstein | G08C 23/04 340/12.26 |

(Continued)

*Primary Examiner* — Robert Hance
(74) *Attorney, Agent, or Firm* — Marsh Fischmann & Breyfogle LLP; Kent A. Lembke

(57) ABSTRACT

A system that enables an event or moments within an event to be captured and provided in a record that preserves at least some aspects of the participant's perspective of the event. In particular, the present invention involves centralized recording of the event in one or more modes including video, audio, and still image recordings and a system that enables a participant (i.e., one who perceives the event) to select portions of the event recording substantially contemporaneously with the event occurrence. A personalized record is made by duplicating the selected portions from the event record. In a particular example, the personalized record is recorded on a digital media such as a compact disc (CD) or digital video disk (DVD) or the like.

74 Claims, 4 Drawing Sheets

Related U.S. Application Data continuation of application No. 13/758,621, filed on Feb. 4, 2013, now Pat. No. 9,038,115, which is a continuation of application No. 13/106,045, filed on May 12, 2011, now Pat. No. 8,370,882, which is a continuation of application No. 10/174,611, filed on Jun. 19, 2002, now Pat. No. 7,945,935.

(60) Provisional application No. 60/299,630, filed on Jun. 20, 2001.

(51) Int. Cl.

| | | |
|---|---|---|
| *G06Q 30/06* | (2012.01) | |
| *H04N 7/173* | (2011.01) | |
| *H04N 21/658* | (2011.01) | |
| *H04N 5/91* | (2006.01) | |
| *H04N 21/442* | (2011.01) | |
| *G11B 27/10* | (2006.01) | |
| *H04N 21/2187* | (2011.01) | |
| *H04N 21/242* | (2011.01) | |
| *H04N 21/43* | (2011.01) | |
| *H04N 21/6543* | (2011.01) | |
| *H04N 21/845* | (2011.01) | |

(56) References Cited

U.S. PATENT DOCUMENTS

| | | | |
|---|---|---|---|
| 5,900,608 A * | 5/1999 | Iida | G06F 17/30017 235/381 |
| 7,197,758 B1 * | 3/2007 | Blackketter | G11B 27/105 348/E5.002 |
| 7,945,935 B2 | 5/2011 | Stonedahl | |
| 8,370,882 B2 | 2/2013 | Stonedahl | |
| 9,038,115 B2 | 5/2015 | Stonedahl | |
| 2001/0037303 A1 * | 11/2001 | Mizrahi | G06Q 20/123 705/52 |
| 2002/0056084 A1 * | 5/2002 | Harris | G08C 19/28 725/1 |
| 2002/0107016 A1 * | 8/2002 | Hanley | G06Q 30/06 455/3.04 |
| 2002/0107947 A1 * | 8/2002 | Moragne | H04L 12/24 709/223 |
| 2003/0097338 A1 * | 5/2003 | Mankovich | G06Q 20/382 705/64 |

* cited by examiner

SYSTEM AND METHOD FOR SELECTING, CAPTURING, AND DISTRIBUTING CUSTOMIZED EVENT RECORDINGS

CROSS-REFERENCE TO RELATED APPLICATIONS

This application is a continuation of U.S. patent application Ser. No. 14/705,085, which was a continuation of U.S. patent application Ser. No. 13/758,621, filed on Feb. 4, 2013 and issued as U.S. Pat. No. 9,038,115, which was a continuation of U.S. patent application Ser. No. 13/106,045, filed on May 12, 2011 and issued as U.S. Pat. No. 8,370,882, which was a continuation of U.S. patent application Ser. No. 10/174,611, filed on Jun. 19, 2002, entitled, "System and Method for Selecting, Capturing, and Distributing Customized Event Recordings," issued as U.S. Pat. No. 7,945,935, which claimed the benefit of U.S. Provisional Application No. 60/299,630 filed Jun. 20, 2001, the disclosures of which are herein specifically incorporated in their entirety by this reference.

BACKGROUND OF THE INVENTION

1. Field of the Invention

The present invention relates, in general, to media recording and distribution, and, more particularly, to software, systems and methods for producing personalized recordings (or "records") of live, pre-recorded and broadcast events.

2. Relevant Background

Attendance at live events or perceiving live or pre-recorded broadcasted events remains an important mode of communicating information in entertainment, education and other fields. For example, concerts, sporting events, seminars, classes, lectures, speeches, conventions and the like involve attended events. Characteristically, an event is something that is ephemeral in that it involves the presentation and perception of the sounds, images, and activities that occur during the event. Even when an event is implemented by playing pre-recorded sounds and images, the event as it is perceived by a participant remains an ephemeral, short-lived occurrence.

An event is defined by a place in which the event occurs, and a time or span of time over which the event occurs. Because of the short-lived nature of events, participants often attempt various methods of making records of the event for future reference. For example, in classes or lectures students frequently take written notes or audio recordings to preserve important information that is delivered. At weddings or other important social occasions, participants bring multiple video cameras, still cameras, audio recorders and the like so that each participant can record their own perception of the same event.

One difficulty with individual participant recordings is that participants tend to be selective about what portions of an event they wish to record, but often make the decision to record a particular portion after it has started. There is no way to go back in time and start recording the interesting part from its beginning, hence, the end product is flawed. Also, because multiple participants are recording essentially the same event, there is tremendous duplication of costs and effort.

Particularly in the entertainment industry, however, such recordings are prohibited. Even where recording is possible, it is difficult to make quality recordings that accurately capture the sounds and images of an event while at the same time participating in the event. For example, taking lecture notes distracts the participant from actively listening to the information presented during the event. Audio and video recordings of seminars or concerts, when permitted, are often of poor quality because the participant's proximity to the event is non-ideal, consumer-grade equipment is used, and/or important portions of the event are missed.

A partial solution involves centralized event recording. For example, a speech or seminar may be video taped or audio taped for later compilation and distribution to the attendees or others paying for the tapes. Similarly, a live concert may be recorded for later distribution as an album. Although these centralized recordings free the participant from distractions and complexity related to making the recording, they lack an ability for the participant to personalize the recording. They record all parts of an event, not just the parts that are important to a participant. Hence, they completely dissociate recording from the user's perspective of the event.

There is a demonstrated market desire for a system that allows event participants to select the content from an event and to produce a personalized record (or recording) using the selected content. A significant underground industry has evolved in producing "bootleg" recordings of concerts, for example. Even though one can purchase a higher-quality recording of the same song that was performed in concert, a strong market exists for the bootleg recording. It is believed that this desire is rooted in the fact that, unlike a high quality studio recording, the bootleg recording captures the unique perspective of an event participant. If such recording were legal, it is expected that a high percentage of concert-goers would use recording equipment to capture their own unique perspective on the event. Moreover, there is a strong desire to constrain or eliminate the market forces that encourage bootlegging.

From the event sponsor, promoters or performer's perspective, this unmet demand is an unused route to produce additional sales from previously created and/or acquired content. These parties work together to create a unique moment in time for the participant that places the participant in a unique state of mind. The images, sounds, and interactions with other participants create a unique, fleeting desire to record particular moments in an event. Once the event has concluded, this fleeting desire is impossible to recreate. As a result, even when events are recorded and later distributed, there is limited desire on behalf of participants to purchase such recordings. Similarly, there are unmet demands for participants to actively participate in the process of building, creating and producing a personalized record of an event, making such recording of significantly greater value to the participant than the mere content alone.

SUMMARY OF THE INVENTION

Briefly stated, the present invention involves a system that enables an event or moments within an event to be captured and provided in a personalized record that preserves at least some aspects of the participant's perspective of the event. In particular, the present invention involves centralized recording of the event in one or more modes including video, audio, and still image recordings and a system that enables a participant (i.e., one who perceives the event) to select portions of the event recording substantially contemporaneously with the event occurrence. A personalized record is made by duplicating the selected portions from the event record. In a particular example, the personalized record is recorded on a digital media such as a compact disc (CD) or digital video disk (DVD) or the like.

DETAILED DESCRIPTION OF THE PREFERRED EMBODIMENTS

In general, the present invention is directed to a personalized event recording and distribution system that enables an event participant to select content or otherwise modify the manner in which a recording of an event is produced. Rather than multiple individual recordings of an event, the present invention involves capturing sounds and images of an event in a centralized recording. Participants make selections by selecting points in time or spans of time during the event that they wish to record. Preferably the selections are made as the event occurs in "real-time". By synchronizing the user selections with the centralized recording, portions of the centralized recording can be identified and duplicated to produce a unique compilation of selections for each participant. In this manner, each user can generate a personalized record from the centralized recording, yet enjoy the advantages of personalizing the recording so that it reflects each participant's unique perspective and preferences.

The term "event" as used herein is construed broadly to mean live performances, live broadcasts or transmissions, as well as performances and transmissions of pre-recorded events. An event may take a single moment in time, or span a period of time. An event may itself comprise a continuous or discontinuous sequence of events. In large part, the present invention recognizes that an event is in a very important way defined by the participants, spectators, viewers and listeners that perceive the event. Hence, even group events are unique to each person that perceives the event irrespective of whether the event is perceived directly and in person, indirectly through a transmission medium, contemporaneously, or at a different time than the original occurrence or from when the event happens.

Figure 1:
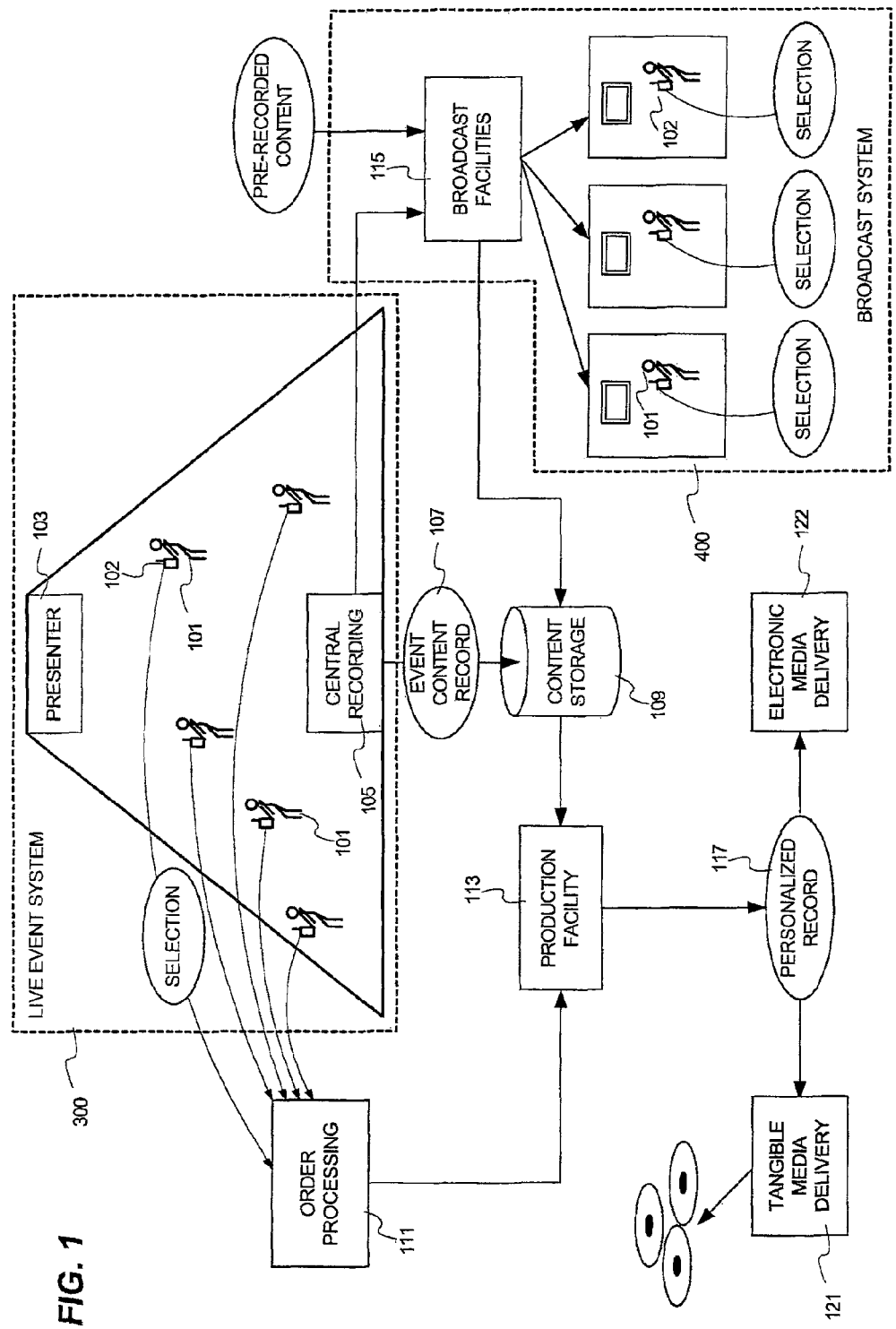
FIG. 1 shows various entities and data exchanges in system in which the present invention is implemented.

FIG. 1 schematically illustrates an overview of various entities and data exchanges that occur in exemplary embodiments of the present invention. In particular, FIG. 1 illustrates a live event system 300, shown in greater detail in FIG. 3, and a Broadcast event system 400 that is shown in greater detail in FIG. 4. Live event system 300 is particularly adapted to "live" events at venues such as concert halls, convention centers, arenas, stadiums, and other venues or forums where events occur. Live event system 300 enables event participants and/or spectators 101 to make spontaneous real-time selections of content at live events such as speeches, conferences, concerts, sporting events, and the like. In particular implementations, live event system 300 and/or broadcast system 400 may include other components shown in FIG. 1 including order processing 111, content storage 109, and the like.

Broadcast system 400 is adapted to an environment where an event occurs in a viewer's home, office, car or other location where an audio and/or video transmission is received. The transmission may be of a live event or of a pre-recorded event. Transmitted events include narrowcast and multicast technologies as well as conventional broadcast. Pre-recorded events become an "event" each time the recording is perceived by a listener/viewer. In either case, the viewer or listener 101 is able to make spontaneous real-time selections of content from the event as it is presented.

Referring first to live event system 300, an event involves a presenter 103 (or plurality of presenters) such as a speaker, performer, athlete or other person that is conveying information or acting in a particular way unique to the event. Presenter 103 may actually be a film presentation, broadcast or simulcast, or a demonstration of a non-human thing or event. In the live event system 300 selected features of the event including, for example, sounds, images, or other record-able features are recorded by a central recording system 105. Recording system 105 may be a digital tape recorder coupled to the sound board in a concert, and/or video cameras. The number and variety of input devices such as microphones, cameras and the like can be adjusted to meet the needs of a particular application. Recording system 105 often will include multiple recording mechanisms. Significantly, the records made by recording system 105 are shared by many or all of participants 101 and in many cases will be shared across multiple events. Hence, there is cost justification for building central recording 105 using high quality, professional-grade equipment that is often impractical for individual participants 101. In many cases, event venues are already outfitted with suitable recording equipment such as a sound board, video equipment, mixers, recording equipment, and the like, in which case the present invention may obtain content from this equipment rather than providing equipment separately.

In a particular example, central recording 105 creates an event record 107 that records the entire event or sequence of events that occur together. Because the entire event is recorded, participants 101 are able to select any portion or segment of the event for their personalized record. Although some participants 101 may desire a recording of the entire event, a significant feature of the invention is the ability for participants 101 to selectively include, or conversely exclude, portions of an event. Selection can occur at any time during an event, even after the start of the desired event segment, while capture of the entire segment is assured allowing a participant to capture and obtain a recording that might otherwise have been missed.

Moreover, the present invention contemplates that the personalized recording (or personalized record) that is produced can be customized not only by selecting content, but by personalizations implemented during printing labels, packaging materials, and the like according to customer preferences. For example, a label printed on the surface of a CD or DVD may include personalized graphics reflecting participant selections, the name or other symbol of the participant, unique graphics and text for the event or forum, and the like. Similarly, packaging materials may include personalized covers, song lists, lyrics, text, speaker names, and the like that reflect personal preferences of the participant.

Participants 101 operate selection devices 102 that allow a user to select a particular moment or span of time within an event. The selection device 102 generates a selection message that uniquely identifies the participant 101 and the time at which a selection is made. The selection device may relay the selection immediately to an order processing system 111 or may store the selection for subsequent transfer to order processing system 111. Order processing system 111 may be implemented by facilities at or near the event venue (i.e., a "local event centers") or may comprise one or more centralized facilities that are remote from the event venue (i.e., "remote event centers") and accessible by network connections, a web site interface, data or voice phone line connections, or by a physical store front or automated sales kiosk that enables participants to transact selections and order personalized records. In the examples herein, order processing services 111 are provided in a centralized system that is used by both broadcast event system 400 and live event system 300, although it is contemplated that separate facilities may be provided and that order processing services 111 may be implemented as a distributed system. In essence, order processing system 111 includes interfaces for receiving selections and production facility 113 synchronizes those selections with event content. That synchronization may be simplified when both the selections and event records include a common time stamp or other explicit synchronization information, or may be more complex when the system must infer some selection information or some event record information. Order collection system uses the selections and synchronization determination to generate production orders that are formatted for use by a production facility 113 to fulfill orders for personalized recordings or records. These orders may take the form, for example, of XML records containing information needed to produce, label, package, ship, and bill for production services.

In broadcast system 400, content may come from a live event (e.g., in the case of a live broadcast) or may comprise pre-recorded content. Broadcast facilities 115 distribute the content over any available broadcast, multicast, narrowcast, or unicast technique to one or more participants 101. Transmission techniques include cable, radio frequency (RF), microwave, satellite transmission, as well as network transmission using various network protocols (e.g., TCP/IP, fibre channel and the like). In a manner akin to the live event system 300, participants (also referred to as viewers or listeners) use a selection device 102 to send selection messages to order processing 111. Selection messages may also be sent to order processing 111 via a conventional telephone, private network, public network such as the Internet, or other available communication mechanisms. In practice, some applications may provide for physically transporting selections and/or content to a production facility via mail, courier, or overnight delivery service. One feature of the present invention is that it can be implemented with a variety of technologies to both record orders and communicate orders so long as the orders are synchronized or can be later synchronized with the central recording of the event.

Selections are handled by order processing unit 111 to generate orders for personalized media production that are sent to a production facility 113. Production facility 113 also has access to the event content records 107 generated by live event system 300 and/or broadcast system 400. The event records, containing the event content, are stored in content storage 109, for example. Content storage 109 may be implemented, for example, by a database or other data storage mechanism at the production facility 113, or by a one or more network-accessible data storage mechanisms.

Production facility 113 comprises, for example, a CD/DVD disc production facility, and preferably a network-accessible or web-access enabled CD/DVD production facility. The production facility 113 produces one or more personalized records 117 such as custom CD/DVD that embody content that corresponds to selections of a specific participant 101. Production facility 113 may be provided by a third party custom duplication service such as offered by Tangible Data, Inc. of Thornton, Colo.

Personalized records 117 may be delivered in a tangible media form such as a CD/DVD, digital tape, or other content storage mechanism including magnetic, optical, and magneto-optic storage media using tangible media delivery services 121. Personalized recordings may also be provided on solid state storage media such as volatile or non-volatile memory devices often used to store music files in digital music players. Alternatively, the personalized record can be shipped electronically via electronic media delivery services 122. In the latter case, the personalized record 117 may comprise, for example, a disk image that can be placed on a hard drive or burned on a personal CD/DVD writer at a facility separate from production facility 113.

Figure 2:
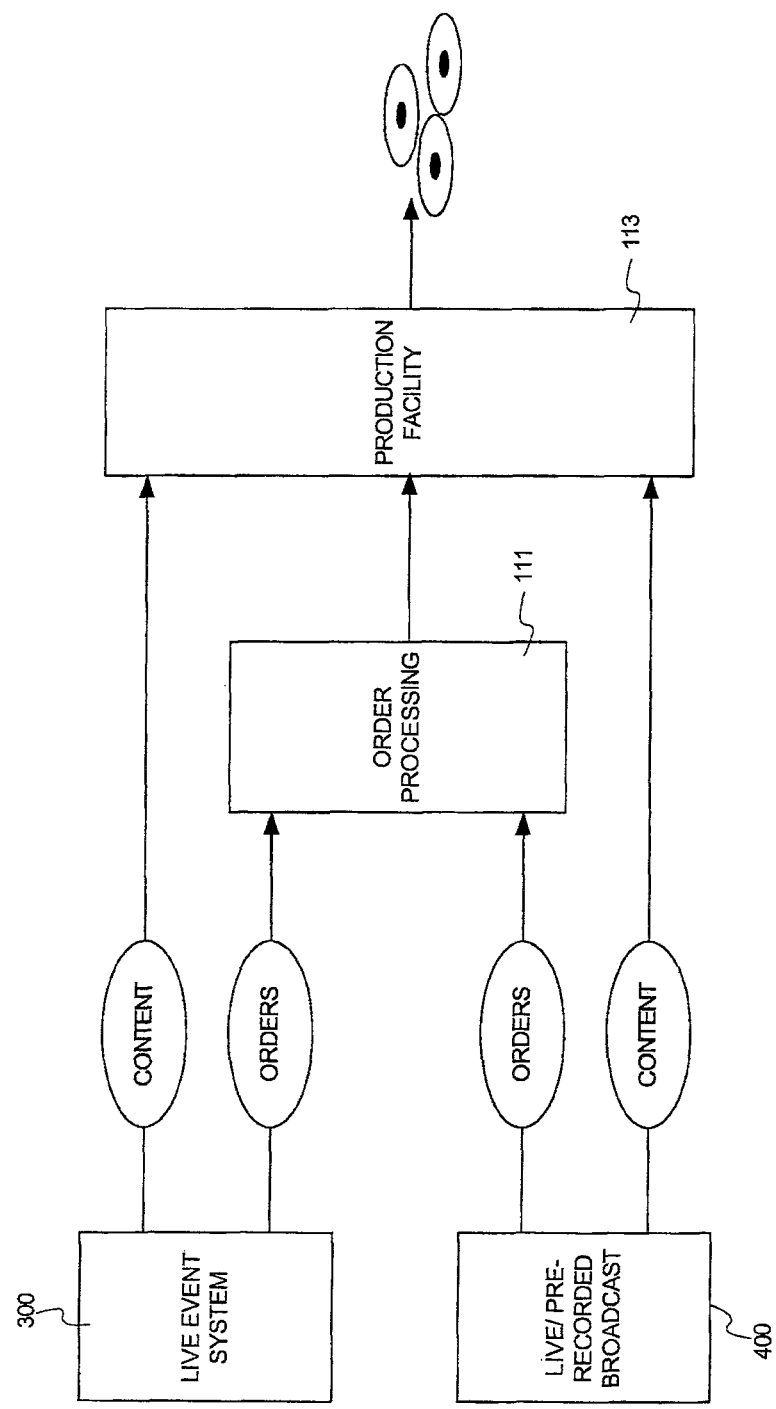
FIG. 2 illustrates in block diagram form basic features of a system in accordance with the present invention.

FIG. 2 illustrates the systems of the present invention from another perspective in somewhat more abstract form than the perspective shown in FIG. 1 to illustrate basic functionality of the various system components. Both live event system 300 and broadcast system 400 generate content and orders, where the orders are synchronized with the content. Orders in FIG. 2 embody one or more selections shown in FIG. 1, and are handled by order processing services 111. Content in the form, for example, of event records, is communicated electronically and/or physically to the production facility 113. Order processing services 111 can provide any necessary or desired services to transform user selections from a plurality of participants 101 and in some implementations a variety of venues, into production orders personalized records 117 for tangible media 121 and/or electronic media 122 delivery.

Figure 3:
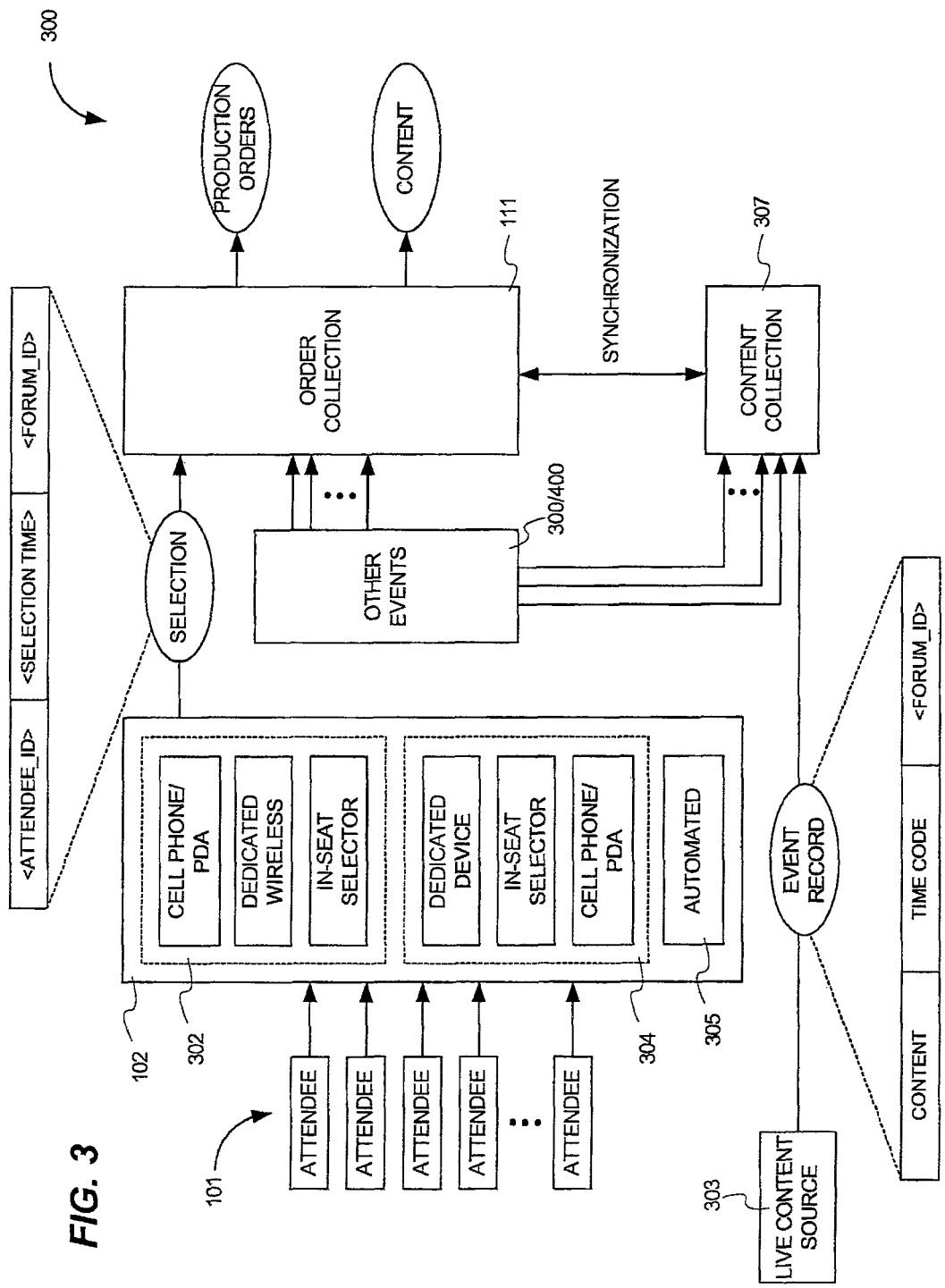
FIG. 3 shows a live event system used in particular implementations of the present invention.

FIG. 3 illustrates a live event system 300 in greater detail in block diagram form. The Live Event System 300, in conjunction with an enabled online CD and DVD Production Facility 113, will allow the attendee of a concert, seminar, sporting event or practically any audience participation presentation event, to select segments of the presentation to be placed on a custom CD or other media and delivered to the attendee in as little as a matter of hours after the event. An immediate need for this system exists in the music concert promotion business. The attendee 101 uses a small handheld selection device 102 (possibly wireless), which may be supplied to them by the event management, for example, to make the selections during the event. As shown in FIG. 3, attendees or customers 101 use a selection device 102 to generate and record selections and orders.

Remote selection devices are of two general classes. Immediate or real time transmission devices 302 operate to capture a participant selection and transmit it substantially immediately to order processing system 111. In contrast, timer-based or delayed transmission 304 involves storing the selections, for example in memory of the selection device 102. Real time transmission devices 302 include wireless selection devices such as cell phones, personal digital assistants (PDAs), laptop and palm computers with network connections, as well as special purpose wired selection devices built into or tethered to participant's seats. Wireless devices 302 include any of a variety of wireless computing devices such as cell phones, and the like that include means for accessing network resources and communicating over a wireless network. Two-way wireless devices offer an advantage in some applications in that the system can signal a user when selections can be made, for example by causing the selection device 102 to display a green light or other indicator during times when selections are valid. A wireless network includes RF, microwave, infrared, and the like that implements one-way or two-way communication with selection device 102.

Cell phones are an example of a wireless selector 302 that uses a conventional telephone network to register selections of an attendee 101. Attendee may, for example, dial a particular phone number to register a selection automatically or through a voice mail system or human interface. Using a cell phone, the attendee ID is already known, and potentially many transaction details such as billing information and the like are implicitly known from the caller identification provided by the cell phone. Similarly, the forum ID, which indicates the physical proximity of an event, may be implied from a cell that picks up the phone call or the phone number dialed by the participant. Alternatively, the forum ID may be previously registered or explicitly indicated with the attendee selection, or identified by the phone number dialed by a user. Built-in GPS cellular capability may also be used to accomplish this forum ID.

One-way and two-way dedicated wireless devices are examples of selection devices 302 that communicate with a local or wide area wireless network that is accessible to the attendee 101. For example, IEEE 802.11 wireless networks are becoming more frequent services at conventions, conferences, educational facilities and entertainment facilities. These may be provided as a service for attendees 101 or for the use of concessionaires and vendors. Many devices such as PDAs and the like can couple to such a standards-based network. Alternatively, a proprietary network may be used.

In other applications, selection device 302 is a wired or wireless device built into, for example, the arm rest or seat back of seats, or provided as a tethered console used to enable interaction with attendees 101. In either case, the adaptations required to record the selections in accordance with the present invention are easily implemented.

Delayed transmission devices 304 may be implemented using most of the same devices used for immediate transmission such as cell phones, PDAs, in-seat devices, special-purpose circuits that have memory to hold user selections. Programmable devices such as cell phones and PDAs can be readily outfitted with application software that creates a user interface for entering selections, storing selections, and later communicating selections with order processing services 111. A delayed transmission device may be as simple as a computer readable ballot or optical scan form. Unlike real time transmission devices 302, network connectivity is not required as selections can be communicated asynchronously after the selection has been made, and even after an event has occurred.

Timer based selector differs from the other selectors in that it includes a synchronization reference such as a local time reference, selection name, selection number or other information that enables synchronization with an event record, and so does not require contemporaneous connection to order processing system 111. A timer based selector can record a local time each time an attendee activates a selection button. By including a time base reference in the event record from live content source 303, the event record can be readily synchronized at any time after the event. The timer based selector can record a single time point during an event, or record beginning and ending time points for an event.

Timer-based selectors may be gathered at an event, deposited with order processing 111 after an event (e.g., dropped off or mailed in), or may be uploaded over a communication link sometime after the selection is made. In one implementation, order processing system 111 includes a network interface such as a web site interface that enables participants to access the system by any available Internet protocol and communication channel. Timer based selectors may take a form similar to small handheld digital music players, digital cameras, or other digital recorders. However, unlike these conventional devices, the timer-based selectors 304 do not actually record sights and sounds of an event, but instead record selection records as described above.

It is also contemplated that participant selections may be partially or fully automated. For example, a selection may be triggered by the user's proximity to an event or event segment. In an amusement park, for example, the selection device 102 may identify the participant to the system using, for example, barcode scanning or radio frequency identification (RFID) technology. The system can then automatically generate a selection on behalf of the user based on the user's presence in the proximity of the event segment. The selections indicate, for example, a user identification obtained from the selection device 102, an identity of the event segment, and the time at which the event segment occurs. Recordings of the automatically selected segment, which may include sounds and images that include the participant, can be later compiled into a personalized record that extracts segments from a common recording that include segments in which the participant was nearby.

As shown in FIG. 3, an event record includes content, and optionally includes a time-base reference (e.g., time code in FIG. 3) and a forum ID. While content is explicitly carried in the event record, the time code and forum ID can be implied or otherwise indicated. For example, an event often occurs only once at a particular location. Hence, the content itself implies the location. A video tape or audio tape plays back at a certain speed, hence, any point within a tape of the event can be defined by the event starting point and an offset time into the event. Content collection unit 307, which may be at the production facility 113, at the live event forum itself, works in conjunction with order processing system 111 to ensure synchronization between selections and portions of event records.

A selection record includes an identification of a unique attendee, a selection time or other indication of a segment of the event that is to be provided on a personalized record (e.g., a segment number), and optionally includes a forum ID if the forum cannot be otherwise determined from the time of the selection or manner in which the selection is communicated.

Figure 4:
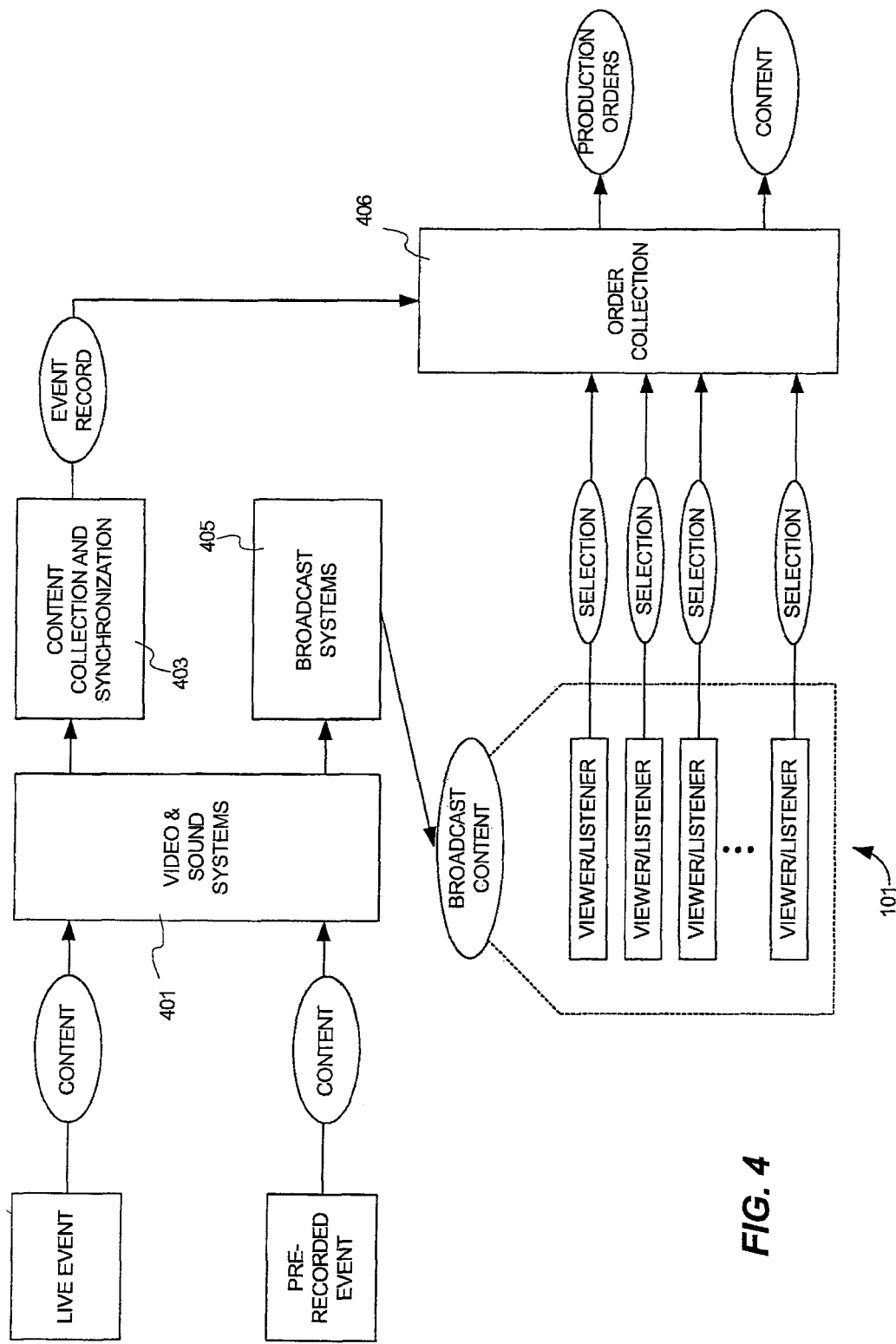
FIG. 4 shows a broadcast event system used in particular implementations of the present invention.

FIG. 4 illustrates broadcast system 400 in greater detail. A broadcasted live event, such as a music concert, which is enabled to operate with the present invention, will allow a listener or viewers 101 to select segments of the event to be recorded, for example on a custom CD or DVD, using any Internet access, cell phone, standard phone, or mobile wireless Internet device, or by mechanisms such as mail-in forms, fax forms, and the like. For example, a live music concert is being broadcast live on a pay-per-view channel or on one of the standard networks. A viewer 101 of the concert wishes to add one of the songs to their custom CD. The viewer 101 can make the selection during the song by accessing the order collection system 406 from any Internet access point including wireless, cell phone or standard phone.

Broadcast system 400 interacts with systems operated by broadcaster in the implementation shown in FIG. 4. For example, the broadcaster's video and sound systems 401 are used to capture content and broadcast systems 405, which are used to deliver the content in a substantially conventional fashion over radio, television, microwave, cable, satellite, or other distribution mechanisms. In accordance with the present invention, content collection and synchronization systems 403 make the content available for personalized records by adding synchronization identifiers (e.g., time stamps, record names, and the like) in a manner that enables order collection system 406 to synchronize participant selections with particular portions of the broadcast content. Order collection system 406 transforms the selections into orders having a suitable format for use by a production facility 113 to produce a personalized record containing content selected by viewers/listeners 101.

In another example, a customer, listening to any radio station that is enabled to operate with the present invention, can select the segment (song, talk, etc.) they are receiving, to be recorded on their custom CD/DVD. They could make this selection by communicating with order collection system 406 via a web server front end, cellular phone, standard phone, or mobile wireless Internet device. In another example, a button or control can be added to radio and/or television devices and/or their remote controls so that when a customer wishes to add the segment they are listening to or experiencing to their custom CD/DVD they simply press the button on the radio or television remote.

A broadcasted pre-recorded event, such as a music concert, which is enabled to use the services of the present invention, allows a listener or viewer to select segments of the event to be recorded on a custom CD or DVD using any data communication network access, access, cell phone, standard phone, or mobile wireless Internet device. This can be expanded to WEB radio. A button or control can be added to the WEB radio control panel. When the listener wants the song he is hearing added to their CD/DVD the listener just presses the button. The interface to the WEB radio site will detect the selection and add that song to the listener's personalized CD/DVD.

As a customer 101 attends enabled events and collects music, speeches, and the like, they cannot only make CDs and DVDs from this content. They can also edit, arrange, and create new CDs and DVDs from the selected content. Each time the customer produces and purchases a CD/DVD from their collection of event content the artists and other appropriate parties are paid. In some implementation, at any time after the delivery of the initial CD/DVD the customer may log on to the order processing service 113, select the re-order section, enter their name or customer number, enter the unique product number of their custom CD/DVD, and order additional copies of the CD/DVD. Anyone, having access to the customer number and custom CD/DVD product number can order copies of the CD/DVD.

By way of example, while attending a music concert enabled to work with the system of the present invention, attendee 101 creates and orders a custom CD of their favorite songs during the concert. The customer receives their CD the next day. The next week the customer takes their custom CD of the concert to work and plays it in their office while working. During the day co-workers come into their office, hear the CD and want one for themselves. The customer can tell the co-workers to log onto the web site that implements an interface to order processing 111, even while at work, and order their own copy of the CD. In this manner, the present invention benefits artists and other content providers by opening up new channels for content distribution.

The present invention is readily adapted to include a number of variations to meet needs of a particular application. For example, event segment selections as described in the examples herein involve selection of a particular time or span of time during an event. This technique works well for an event that comprises a sequence of segments that occur in a time-ordered fashion. However, in some cases, an event comprises a sequence of segments where the time-order is less relevant to the participant. For example, in a museum or amusement park, a participant may wish to create a record of particular exhibits that are viewed without respect to when they are reviewed. In such cases, a participant may desire to order selections in terms of relative physical location irrespective of the relative time in which the event segment was perceived. Hence, given the definition that an event is defined by a particular time and place, it is contemplated that a participant may define selections by specifying either time, or place, or both, and use that selection to retrieve previously or contemporaneously recorded content associated with that time or place.

A significant feature of the present invention is that it enables a controlled, easily regulated distribution of valuable content so as to protect and preserve rights of artists, performers and other content creators and owners. Because recording operations are centralized, negotiated royalties can be paid to appropriate parties when a personalized record (or recording) is produced. Moreover, any available rights management processes can be incorporated with the present invention. For example, the personalized recording can be formatted, encrypted, or watermarked to discourage subsequent copies of the personalized record.

Although the invention has been described and illustrated with a certain degree of particularity, it is understood that the present disclosure has been made only by way of example, and that numerous changes in the combination and arrangement of parts can be resorted to by those skilled in the art without departing from the spirit and scope of the invention, as hereinafter claimed.

The above description and supporting figures show a system for recording event (e.g., the system of FIG. 1). The system includes a centralized recording facility operable to record a feature of the event. The system also includes a selection device operable by an individual user, with the selection device allowing the user to select segments of the event for personal recording (or to provide a personal record). The system also includes a media production mechanism (e.g., the order processing 111 and the production facility 113 components of the system of FIG. 1) operable to obtain the user-selected segments, to obtain segments of the record corresponding to the selected portions, and to produce a derivative recording (e.g., a personal record or recording) containing only the user-selected segments.

In some embodiments of the system, the event is a live event while in the same or other embodiments the event is a pre-recorded event. In some cases, the selection device includes a memory operable to log times corresponding to the user selections. The event may also include a plurality of segments, with each segment spanning a time period, and the user selection of an entire segment includes selection at a time point anywhere within the time period of a segment. The feature of the event may include an audio sequence, may include a still image, and/or may include a video sequence.

The centralized recording facility may operate independently of the user and the user selection device. Further, in implementing the system, the system may include a plurality of centralized recording facilities operable to record multiple perspectives of the event. The selection device may then enable a user to select event segments from each of the multiple perspectives irrespective of the user's own perspective. In some cases, the user is a participant in the event.

The description and figures also describe a device for obtaining event records. The device includes an interface allowing a user to designate a portion of an event for which a recording is desired and also includes a selection record containing an identification of the designated portion of an event such that a recording (or record) of the designated portion can be retrieved using the selection record. The device may also include means for communicating the user designation to a central recording facility.

The description and figures also teach a method of producing a personalized record or recording of portions of an event. The method includes centrally recording the event to create an event record and obtaining participant selections that identify individual participants and event portions selected by the participants. The method also includes synchronizing the selections with the event record and duplicating the participant-selected portions from the event record to a personalized record or recording for the participant. The personalized record contains the participant-selected event portions. The method may also include communicating the participant selections to an order processing unit contemporaneously with the event. The method may include communicating the participant selections to an order processing unit after the event.

The description and figures further teach an order processing system for production of personalized recordings (or records). The system includes an interface for receiving selection records, where each selection record indicates a portion of an event for which a record or recording is desired. The system further includes synchronization mechanisms for synchronizing the selection records with particular segments of independently recorded content. The system includes an order generator coupled to receive the selection records and generate production orders suitable for processing by a media production facility to produce a personalized record (or recording) containing the particular segments identified by the selection records.

I claim:

1. A system for recording events comprising:
   a recording mechanism operable to create an event record of an event at an event venue;
   a selection device operable by a user, the selection device allowing the user, during performance of the event, to select portions of the event creating user event selections; and
   a media production mechanism operable to obtain the user event selections, obtain portions of the event record corresponding to the user selected portions, and produce a derivative record containing the user selected portions of the event,
   wherein the event comprises one or more event portions stored on the event record that each span a time period,
   wherein user selection of an entire one of the event portions comprises entering a user selection by operation of the selection device during the event, to select a particular one of the event portions, at any time within the time period corresponding to the entire one of the event portions,
   wherein the media production mechanism obtains the user selected portions of the event by synchronizing the user event selections corresponding to the particular one of the event portions with event content in the event record, and
   wherein television broadcasted content of the live event portions to be selected is not required to be displayed on the selection device, operated at the event venue, for use in the entering of the user event selection.

2. The system of claim 1, wherein the selection device comprises a memory operable to log the particular moments of time corresponding to user selections.

3. The system of claim 2, wherein the user event selections are stored in a selection record that is provided to the media production mechanism, along with at least one of a user identification, an event identification, and an event venue identification, for use in the obtaining of the portions of the event record of the event for the derivative record.

4. The system of claim 3, wherein at least one of the event identification and the event venue identification includes GPS location information.

5. The system of claim 1, wherein the event content comprises at least one of video, audio, one or more still images, and a written record.

6. The system of claim 1, wherein the portions of the event, the user event selections, and the derivative record comprise a digital signal.

7. The system of claim 1, wherein the recording mechanism operates independently of the user and the selection device.

8. The system of claim 1, further comprising a plurality of recording mechanisms operable to record multiple event segments of the event, wherein the selection device enables a user to select the event portions from among the multiple event segments of the event at the event venue.

9. The system of claim 1, wherein the event comprises at least one of pre-recorded content and a live event and wherein the pre-recorded content or content associated with the live event is broadcast to the user for experiencing by the user.

10. The system of claim 9, wherein, during experiencing of the broadcasted event content, the user operates the selection device to select the portions of the event.

11. The system of claim 1, wherein the user event selections comprise synchronization information and wherein the selection device transmits the user event selections to the media production mechanism.

12. The system of claim 11, wherein the synchronization information comprises at least one of a time stamp, a user identification, an event identification, and an event venue identification.

13. The system of claim 11, wherein the synchronization information comprises explicit synchronization information to enable identification of the event records and synchronization with the user event selections.

14. The system of claim 13, wherein synchronization information for at least one of the portions of the event is communicated to the selection device for use in selection of the event portions.

15. The system of claim 1, wherein the recording mechanism operates to record the event during the performance of the event to the event record and wherein the media production mechanism operates to obtain user selected portions of the event from the event record after the performance of the event.

16. The system of claim 1, wherein the selection device is operated during the performance of the event and after the selected portions are each started to enter the user selections of the entire ones of the event portions for inclusion on the derivative record.

17. The system of claim 1, further comprising a plurality of additional ones of the selection devices operable by additional ones of the individual users during the performance of the event to independently select additional ones of the portions of the event.

18. The system of claim 17, wherein the media production mechanism further operates to produce additional ones of the derivative records containing user selected portions of the event based on the user event selections and wherein at least some of the additional ones of the derivative records differ in content from each other.

19. The system of claim 1, wherein the event includes a concert including one or more songs, wherein the time period comprises a start time and an end time for each of the songs, and wherein each of the user selections corresponds to a time between the start time and the end time for one of the songs.

20. The system of claim 1, wherein the particular moment in time is local time, with regard to the event venue, at which the user activated the selection device, whereby a local time reference is used by the media production mechanism as a synchronization reference for performing the synchronizing of the user selection to the event.

21. The system of claim 1, wherein the selection device is configured to be triggered to make user event selections based on proximity of the user to a location associated with the event in the event venue.

22. The system of claim 1, wherein the derivative record is delivered or communicated to the user in at least one of tangible media form and via electronic delivery.

23. The system of claim 1, wherein the user selected portions comprise all of the portions stored on the event record.

24. The system of claim 1, further comprising a plurality of mobile computing mechanisms each functioning as at least one of a recording mechanism, a selection device, and a media production mechanism to produce the derivative record containing the user selected portions of the event.

25. The system of claim 1, wherein the user event selections comprise at least one of a signal identifying the selected portions of the event record, and event portion information identifying the selected portions of the event in the event record.

26. The system of claim 1, wherein in the derivative record preserves at least some aspects of the user's perspective of the event.

27. A device for obtaining event records, comprising:
a processor;
memory; and
a data entry mechanism including a display screen;
wherein the processor operates the data entry mechanism to provide an interface allowing a user to designate one or more portions of a live performance of an event for which a record is desired,
wherein the portions of the event each span a time period within a duration of the event,
wherein the interface is operable by the user during the duration of the event to designate the portions,
wherein the event occurs at a venue, wherein the interface is operable by the user during the live performance, and
wherein the interface allows selection of portions of the event, creating user event selections, without the need for the interface to display a television broadcast of the portions of the event to be selected; and
a selection record stored in the memory containing the user event selections of the designated portions of the event such that a derivative record of the designated portions can be retrieved using the selection record and including an identification of the user to link the derivative record to the user, wherein the identifications of the designated portions each comprises at least one of a portion selection identification and a time falling in one of the time periods for the event.

28. The device of claim 27, further comprising means, including a wireless communications element, for communicating the user event selections to an order collection mechanism.

29. The device of claim 27, wherein the interface displays an indicator during times when the user is able to validly designate the portion of the event for which a record is desired.

30. The device of claim 29, further comprising means, including a wireless communications element, for communicating the identifications of the portions of the event to the interface.

31. The device of claim 27, wherein the identifications of the designated portions of the event each comprises explicit synchronization information that enables identification of the designated portions, and synchronization with a designation by the user via the interface.

32. The device of claim 27, wherein the identifications of the designated portions comprise at least one of a user identification, an event identification, and an event venue identification and wherein each of the identifications comprises explicit synchronization information that enables identification of the designed portions of the event and synchronization of the designated portions with the user.

33. The device of claim 27, wherein the event comprises at least one of pre-recorded content and a live event and wherein the pre-recorded content or the content associated with the live event is broadcast to the user for experiencing by the user.

34. The device of claim 33, wherein, during the experiencing of the broadcasted event content, the user operates the interface to select the portions of the event.

35. A system for recording events comprising:
a recording mechanism creating an event record of an event;
a selection device operable by a user, wherein the selection device displays a user interface that allows, selection of portions of the event, creating user event selections that are stored in memory of the selection device in a selection record, during performance of the event, without the need for the selection device to display a television broadcast of the portions of the event to be selected in the user interface; and
a media production mechanism obtaining the user event selections, obtaining the event record corresponding to the selected portions and producing a derivative record containing the selected portions of the event, wherein the selection record includes a user identification linking the derivative record to the user,
wherein the event comprises one or more event portions stored on the event record,
wherein selection of an entire one of the event portions comprises entering a selection by operating the selection device during the performance of the event to select an entire one of the event portions, and
wherein the media production mechanism obtains the selected portions by synchronizing the user event selections with event content in the event record.

36. The system of claim 35, wherein the performance of the event comprises a live performance at an event venue.

37. The system of claim 35, wherein the user is an attendee of the live performance at the event venue.

38. The system of claim 35, wherein the user is remote from the event venue during the event and is receiving content associated with the performance of the event via broadcast.

39. The system of claim 35, wherein the event comprises at least one of pre-recorded content and a live event and wherein the pre-recorded content or the content associated with the live event is broadcast to the user for experiencing by the user.

40. The system of claim 35, further comprising communicating the event portions to a recording mechanism contemporaneously with the event.

41. The system of claim 35, further comprising a plurality of mobile computing mechanisms each functioning as at least one of a recording mechanism, a selection device, and a media production mechanism to produce the derivative record containing the selected portions of the event.

42. The system of claim 35, wherein the derivative record is delivered or communicated to the user in at least one of tangible media form and via electronic delivery.

43. The system of claim 35, wherein the derivative record comprises all the event portions stored on the event record.

44. The system of claim 35, wherein identification of the selected portions of the event comprises explicit synchronization information that enables identification of the portions of the event and synchronization with the user.

45. The system of claim 35, wherein identification of the selected portions of the event includes at least one of the user identification, an event identification, an event venue identification, and explicit synchronization information that enables identification of the event portions and synchronization with the user.

46. The system of claim 35, wherein identification information for at least one of the event portions is communicated to the selection device for use in selection of the event portions.

47. The system of claim 35, wherein the user event selections comprise at least one of a signal identifying the selected portions of the event record and event portion information identifying the selected portions of the event in the event record.

48. The system of claim 35, wherein the derivative record preserves at least some aspects of the user's perspective of the event.

49. A method of producing a record of portions of an event created by a presenter comprising:
with a recording mechanism, recording the event to create an event record stored in memory;
with a media production mechanism, obtaining participant event selections that identify participants with a participant identification and event portions selected by the participants, wherein the participant event selections are created during the event by the participants operating a selection device and the participant event selections are stored in memory of the selection device in a selection record and wherein the selection device displays a user interface that allows selection of the event portions to create the participant event selections, without the need for the selection device to display television broadcast transmissions of the portions of the event to be selected, and wherein the participants are at least one of attendees of the event operating the selection device at a place where the event occurs and participants operating the selection device at a place remote from the place where the event occurs, whereby the event portions selected by the participants correspond to the event as perceived by the participants while the event occurs; and
synchronizing the event participant selections with the event record.

50. The method of claim 49, further including with the media production mechanism, generating a derivative record for each of the participants containing the participant selected event portions using the participant event selections from the event record.

51. The method of claim 50, wherein the event portions each comprise a segment of the event corresponding to a unique period of time during the event.

52. The method of claim 50, wherein the derivative record is delivered or communicated to the participants in at least one of tangible media form and via electronic delivery.

53. The method of claim 50, wherein the derivative record preserves at least some aspects of the user's perspective of the event.

54. The method of claim 49, further comprising communicating the participant event selections to an order processing system contemporaneously with the event, wherein the participant event selections include at least one of the participant identification, an event identification, and an event venue identification.

55. The method of claim 49, further comprising communicating the participant event selections to an order processing system after the event, wherein the participant event selections include at least one of the participant identification, an event identification, and a venue identification.

56. The method of claim 49, wherein the identification of the event portions selected by the participants each comprises explicit synchronization information that enables identification of the portions of the event and synchronization with the event record.

57. The method of claim 56, further comprising communicating identification information for at least one of the event portions to the selection device for use in selection of the event portions.

58. The method of claim 49, wherein the event comprises at least one of pre-recorded content and a live event and wherein the pre-recorded content or the content associated with the live event is broadcast to the user for experiencing by the user.

59. The method of claim 58, wherein, during the experiencing of the broadcasted event content, the user operates the selection device to select the portions of the event.

60. The method of claim 49, further comprising a plurality of mobile computing mechanisms each functioning as at least one of a recording mechanism, a selection device, and a media production mechanism to produce a derivative record containing the user selected portions of the event.

61. The method of claim 60, wherein the derivative record preserves at least some aspects of the user's perspective of the event.

62. A system for recording events comprising:
a recording mechanism creating an event record of an event;
a selection device operated by a user wherein the selection device displays a user interface that allows selection of portions of the event, creating user event selections that are stored in memory of the selection device in a selection record during performance of the event, without the need for the selection device to display a television broadcast of the portions of the event to be selected in the user interface; and
a media production mechanism obtaining the user event selections, obtaining segments of the event record corresponding to the user selected portions, and producing a derivative record containing the user selected portions of the event, wherein the selection record includes a user identification linking the derivative record to the user, wherein the event comprises one or more event portions stored on the event record that each span a time period, wherein user selection of an entire one of the event portions comprises entering a user selection by operating the selection device during the performance of the event to select a particular moment of time within the time period corresponding to the entire one of the event portions, and wherein the media production mechanism obtains the user selected portions by synchronizing the user event selections with event content in the event record.

63. The system of claim 62, wherein the event comprises pre-recorded content.

64. The system of claim 62, wherein the performance of the event comprises a live performance at an event venue.

65. The system of claim 64, wherein the users are participants of the live performance at the event venue.

66. The system of claim 62, wherein the users are remote from the event venue during the event and receive broadcasted content associated with the event.

67. The system of claim 62, wherein the event comprises at least one of pre-recorded content and a live event and wherein the pre-recorded content or content associated with the live event is broadcast to the user for experiencing by the user.

68. The system of claim 67, wherein, during the experiencing of the broadcasted event content, the user operates the selection device to select the portions of the event.

69. The system of claim 62, wherein the derivative record is delivered or communicated to the user in at least one of tangible media form and via electronic delivery.

70. The system of claim 62, wherein identifications of the event portions selected by the user each comprises explicit synchronization information that enables identification of at least one of the event portions and synchronization with at least one of the user event selections.

71. The system of claim 62, wherein identification of at least one of the user identification, an event identification, and an event venue identification comprises explicit synchronization information that enables identification of the selected event portions and synchronization with the user.

72. The system of claim 62, wherein identification information for at least one of the portions of the event is communicated to the selection device for use in selection of the at least one of the portions of the event.

73. The system of claim 62, further comprising a plurality of mobile computing mechanisms each functioning as at least one of a recording mechanism, a selection device, and a media production mechanism to produce the derivative record containing the user selected portions of the event.

74. The system of claim 62, wherein the derivative record preserves at least some aspects of the user's perspective of the event.

* * * * *